(12) United States Patent
Nesori et al.

(10) Patent No.: US 11,605,398 B2
(45) Date of Patent: Mar. 14, 2023

(54) HEAD ACTUATOR AND DISK DEVICE

(71) Applicants: Kabushiki Kaisha Toshiba, Tokyo (JP); Toshiba Electronic Devices & Storage Corporation, Tokyo (JP)

(72) Inventors: Hirofumi Nesori, Chuo Tokyo (JP); Kenichiro Aoki, Machida Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/588,928

(22) Filed: Jan. 31, 2022

(65) Prior Publication Data
US 2022/0383899 A1 Dec. 1, 2022

(30) Foreign Application Priority Data
May 27, 2021 (JP) .............................. JP2021-089302

(51) Int. Cl.
*G11B 5/48* (2006.01)
(52) U.S. Cl.
CPC .................. *G11B 5/484* (2013.01)
(58) Field of Classification Search
None
See application file for complete search history.

(56) References Cited

U.S. PATENT DOCUMENTS

| | | | | |
|---|---|---|---|---|
| 5,541,788 A * | 7/1996 | Ishida | ................ | G11B 33/122 |
| 5,995,328 A * | 11/1999 | Balakrishnan | ....... | G11B 5/4846 |
| 6,975,488 B1 * | 12/2005 | Kulangara | ............. | G11B 5/486 |
| | | | | 360/246 |
| 7,079,357 B1 * | 7/2006 | Kulangara | ............. | G11B 5/486 |
| | | | | 360/245.9 |
| 7,092,215 B2 * | 8/2006 | Someya | ................ | G11B 5/486 |
| | | | | 360/246 |
| 7,894,164 B2 | 2/2011 | Hur | | |
| 8,598,460 B2 | 12/2013 | Contreras et al. | | |
| 8,879,212 B1 * | 11/2014 | Huber | .................... | G11B 5/486 |
| | | | | 360/245.9 |
| 9,064,513 B1 * | 6/2015 | Pan | ......................... | G11B 5/486 |
| 9,324,345 B2 * | 4/2016 | Juman | ................... | G11B 5/4833 |
| 2004/0240118 A1 * | 12/2004 | Hayakawa | ............. | G11B 5/486 |
| | | | | 360/264.2 |
| 2005/0190503 A1 * | 9/2005 | Maeda | .................... | G11B 33/08 |
| 2009/0080114 A1 | 3/2009 | Yao et al. | | |
| 2012/0081815 A1 * | 4/2012 | Arai | ........................ | G11B 5/486 |

(Continued)

*Primary Examiner* — William J Klimowicz
(74) *Attorney, Agent, or Firm* — Allen & Overy LLP

(57) ABSTRACT

According to one embodiment, a head actuator includes a first suspension assembly including a first support plate, a first wiring member with first wiring lines, and a first head, and a second suspension assembly including a second support plate, a second wiring member with second wiring lines, and a second head. The first wiring lines include at least four first read lines and at least four first write lines. The second wiring lines include at least four second read lines and at least four second write lines. At least two of the first read lines and at least two of the first write lines are arranged at a position offset to the second read lines and the second write lines in a width direction of the wiring member.

9 Claims, 9 Drawing Sheets

(56) References Cited

U.S. PATENT DOCUMENTS

| | | | |
|---|---|---|---|
| 2012/0160538 A1* | 6/2012 | Contreras | G11B 5/486 |
| | | | 174/115 |
| 2012/0160548 A1* | 6/2012 | Contreras | G11B 5/486 |
| | | | 174/250 |
| 2012/0162825 A1* | 6/2012 | Contreras | G11B 5/486 |
| 2016/0019918 A1* | 1/2016 | Juman | G11B 5/486 |
| | | | 360/244.2 |

* cited by examiner

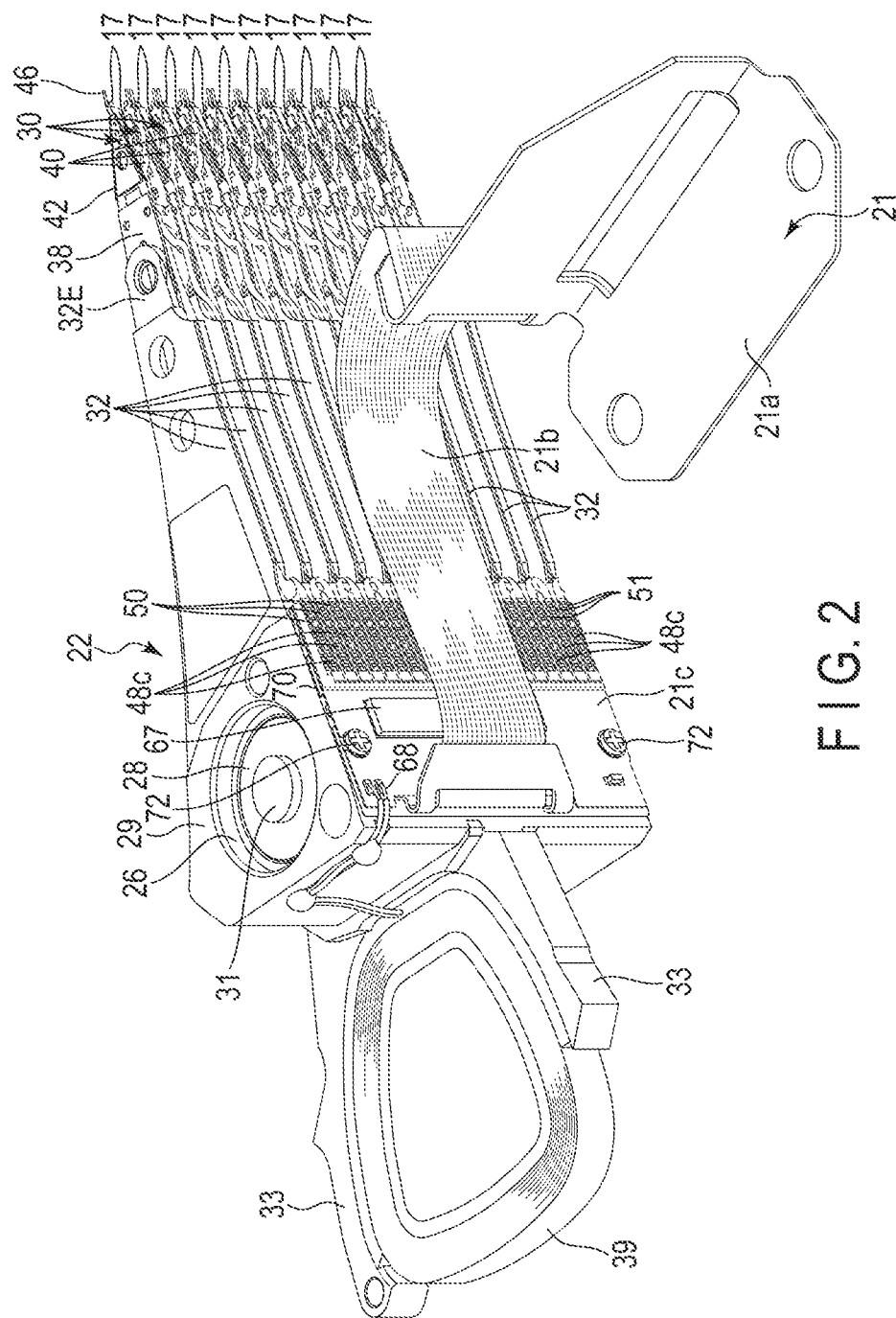
F I G. 2

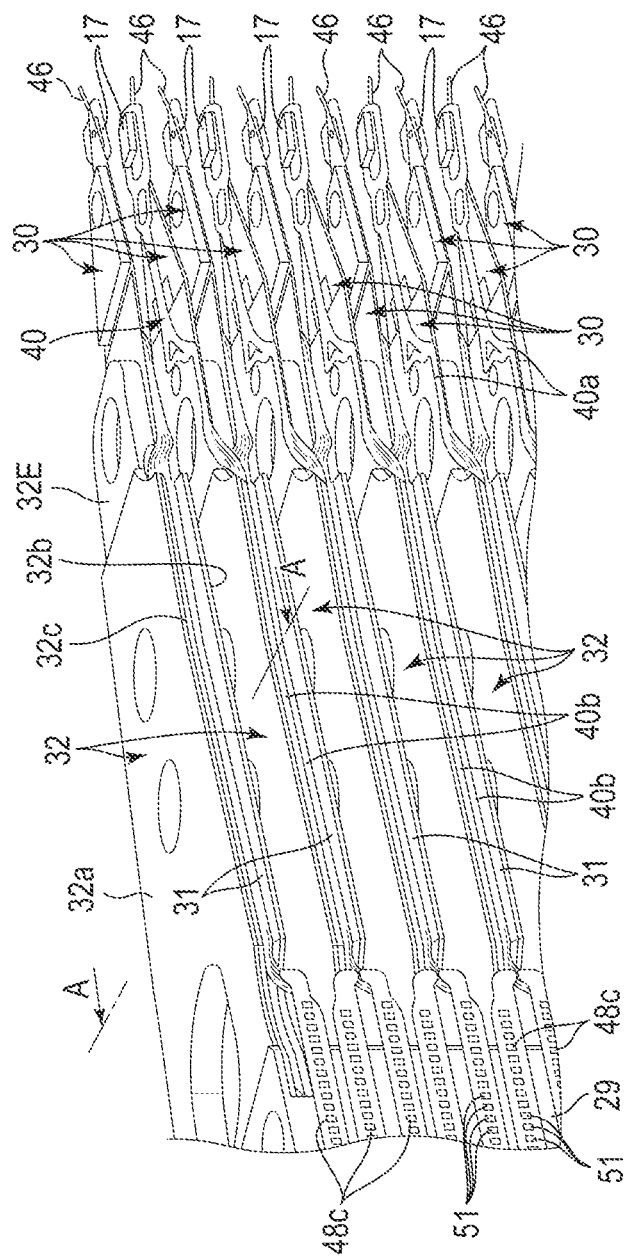
F I G. 3

US 11,605,398 B2

HEAD ACTUATOR AND DISK DEVICE

CROSS-REFERENCE TO RELATED APPLICATIONS

This application is based upon and claims the benefit of priority from Japanese Patent Application No. 2021-089302, filed May 27, 2021, the entire contents of which are incorporated herein by reference.

FIELD

Embodiments described herein relate generally to a head actuator and a disk device including the head actuator.

BACKGROUND

For example, a hard disk drive (HDD), which is known as a disk device, includes a plurality of magnetic disks arranged rotatably in a housing, a plurality of magnetic heads that read/write information from/to the magnetic disks, and a head actuator supporting the magnetic heads in such a way as to allow the magnetic heads to move relative to the magnetic disks.

The head actuator includes an actuator block supported rotatably, and a plurality of head suspension assemblies (may be referred to as gimbal assemblies (HGA)) that extend from the actuator block and support the magnetic heads at their distal end portions. The head suspension assembly has a support plate whose one end is fixed to an arm, and a flexure (wiring member) provided on the support plate. The flexure has a displaceable gimbal portion, and the magnetic head is supported on the gimbal portion. The flexure extends along the arm to the actuator block.

As the capacity of the HDD increases, the number of magnetic disks and suspension assemblies incorporated in the HDD has been increasing. This has brought a concern about not only crosstalk between wires of a flexure in the surface direction but also crosstalk between flexures of HGAs counter to each other in the vertical direction.

BRIEF DESCRIPTION OF THE DRAWINGS

FIG. 2 is a perspective view of a head actuator assembly and an FPC unit of the HDD.

FIG. 3 is a perspective view of arms and head suspension assemblies of the head actuator assembly.

DETAILED DESCRIPTION

Figure 1:
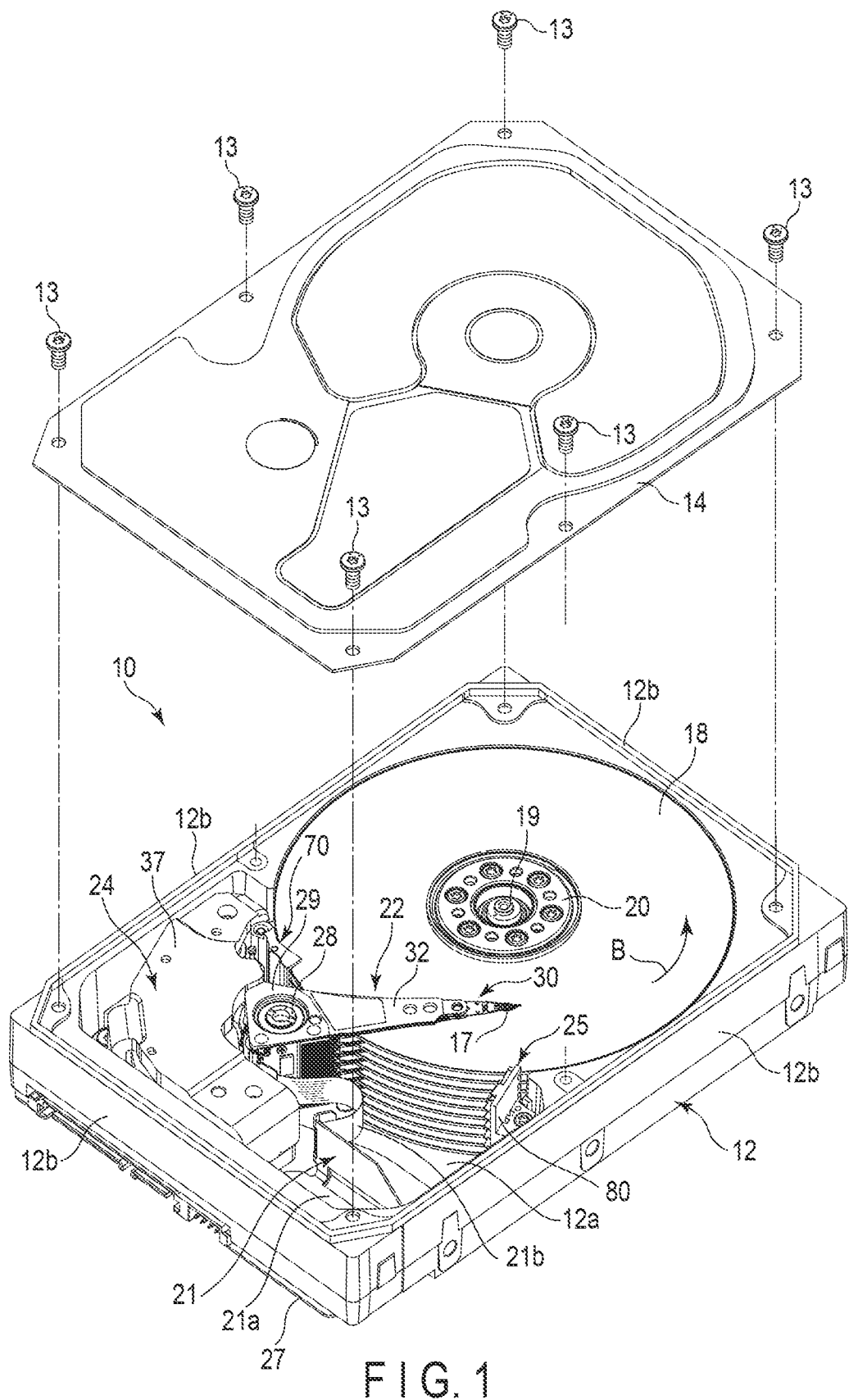
FIG. 1 is an exploded perspective view of a base and a top cover of a hard disk drive (HDD) according to an embodiment.

Embodiments will be described hereinafter with reference to the accompanying drawings. In general, according to one embodiment, a head actuator comprises: a first suspension assembly including a first support plate, a first wiring member on the first support plate, including a plurality of first wiring lines, and a first head supported by the first support and facing in a first direction; and a second suspension assembly including a second support plate opposed to the first support plate with a gap, a second wiring member on the second support plate, including a plurality of second wiring lines, and a second head supported by the second support plate and facing in a second direction opposite to the first direction. The first wiring member includes a first proximal end side portion extending out of the first support plate, and the second wiring member includes a second proximal end side portion extending out of the second support plate and opposed to the first proximal end side portion. The first wiring lines include at least four first read lines and at least four first write lines, the first read lines and first write lines extending in a longitudinal direction of the first wiring member and lined up at intervals in a width direction of the first wiring member, and the second wiring lines include at least four second read lines and at least four second write lines, the second read lines and second write lines extending in a longitudinal direction of the second wiring member and lined up at intervals in a width direction of the second wiring member. At least two of the first read lines and at least two of the first write lines are arranged at a position offset to the second read lines and the second write lines in the width direction so that the first read lines and the first write lines are not opposite to the second read lines and the second write lines in a direction perpendicular to a surface of the first wiring member.

It should be noted that the disclosure is merely an example, and appropriate changes that can be easily conceived by those skilled in the art without departing from the scope of the present invention are naturally included in the scope of the present invention. In order to make the description clearer, the drawings may schematically show the width, thickness, shape, and the like of each part as compared with the actual mode, however, this is merely an example, and the interpretation of the present invention is not limited thereto. In the specification and the drawings, the same elements as those previously described with reference to previous drawings are denoted by the same reference numerals, and detailed description thereof may be appropriately omitted.

First Embodiment

As a disk device, a hard disk drive (HDD) according to the embodiment will be described in detail.

FIG. 1 is an exploded perspective view of the HDD according to the first embodiment shown with a top cover removed.

As shown in FIG. 1, the HDD includes a housing 10 of a rectangular shape. The housing 10 comprises a base 12 of a rectangular box shape with a top opening, and a cover (top cover) 14. The base 12 includes a rectangular bottom wall 12a and side walls 12b erected along a periphery edge of the bottom wall 12a. The base 12 is molded integrally out of, for example, aluminum. The cover 14 is made of, for example, stainless steel and is formed into a rectangular plate shape. The cover 14 is screwed onto the side walls 12b of the base 12, using a plurality of screws 13, thus airtightly closing the top opening of the base 12.

The housing 10 houses therein a plurality of magnetic disks 18, for example, 10 magnetic disks 18, which are disk-shaped recording media, and a spindle motor 19 that supports and rotates the magnetic disks 18. The spindle motor 19 is disposed on the bottom wall 12a. Each magnetic disk 18 includes a substrate made of a disk-shaped non-magnetic material such as glass or aluminum having, for example, a diameter of 95 mm (3.5 inches), and magnetic recording layers formed respectively on an upper surface (first surface) and a lower surface (second surface) of the substrate. The magnetic disks 18 are coaxially fitted to a hub (not shown) of the spindle motor 19, and are clamped by a clamp spring 20. As a result, the magnetic disks 18 are supported such that they are kept parallel with the bottom wall 12a of the base 12. The magnetic disks 18 are rotated by the spindle motor 19 in an arrowed direction B at a given rotation speed. The number of the magnetic disks 18 mounted is not limited to 10, and may be 9 or less, or 11 or more, or 12 or less.

In the housing 10, there are provided a plurality of magnetic heads 17 for recording/reading information on/from the magnetic disks 18, and an actuator assembly 22 supporting the magnetic heads 17 to be movable relative to the magnetic disks 18. In the housing 10, there are further provided a voice coil motor (VCM) 24 for rotating and positioning the actuator assembly 22, a ramp load mechanism 25 for holding the magnetic heads 17 at an unload position away from the magnetic disks 18 when the magnetic heads 17 is moved to the outermost circumference of the magnetic disk 18, a board unit (flexible printed circuit unit or FPC unit) 21 on which electronic components such as a conversion connector are mounted, and a spoiler 70.

The ramp load mechanism 25 includes a ramp 80. The ramp 80 is fixed to the bottom wall 12a of the base 12, and is located near the peripheral edges of the magnetic disks 18. When the HDD is not in operation, the magnetic heads 17 move away from the outer periphery of the magnetic disks 18 to a given stop position. At this point, a tab of a suspension assembly 30, which will be described later, runs onto the ramp 80. As a result, the magnetic heads 17 are held at a position separated away from the magnetic disk 18.

A printed circuit board 27 is screwed to the outer surface of the bottom wall 12a of the base 12. The printed circuit board 27 serves as a control unit that controls the operation of the spindle motor 19 and that controls also the operations of the VCM 24 and the magnetic heads 17 through the board unit 21.

The actuator assembly 22, the VCM 24, the board unit 21, and the control unit (printed circuit board 27) constitute a head actuator.

FIG. 2 is a perspective view of the actuator assembly. As shown in FIG. 2, the actuator assembly 22 comprises an actuator block 29 having a through-hole 26, a bearing unit (unit bearing) 28 placed in the through-hole 26, a plurality of arms 32, for example, 11 arms 32 extending from the actuator block 29, suspension assemblies 30 attached respectively to the arms 32, which suspension assemblies may also be referred to as head gimbal assemblies (HGA), and the magnetic heads 17 supported by the suspension assemblies 30. A support shaft (pivot shaft) 35 is erected on the bottom wall 12a of the base 12. The actuator block 29 is supported by the bearing unit 28 to be rotatable around the support shaft 31.

In this embodiment, the actuator block 29 and the 11 arms 32 are integrally molded out of aluminum or the like to form a so-called E block. Each arm 32 is formed into, for example, an elongated plate shape, and extends from the actuator block 29 in a direction perpendicular to the support shaft 31. The 11 arms 32 are arranged parallel with each other, with a gap formed between adjacent arms.

The actuator assembly 22 includes a support frame 33 extending from the actuator block 29 in the direction opposite to the arm 32. A voice coil 39 constituting a part of the VCM 24 is supported by the support frame 33. As shown in FIG. 1, the voice coil 39 lies between a pair of yokes 37, one of which is fixed to the base 12, and a magnet is fixed to one of the yokes 37. The voice coil 39, the yokes 37, and the magnet constitute the VCM 24.

As shown in FIG. 2, the actuator assembly 22 comprises 20 suspension assemblies 30 each supporting the magnetic head 17. The suspension assemblies 30 include an up-head suspension assembly that supports the magnetic head 17 upward and a down-head suspension assembly that supports the magnetic head 17 downward. The up-head suspension assembly and the down head suspension assembly are configured by arranging the suspension assemblies 30 having almost the same structure in different vertical directions.

In this embodiment, as indicated in FIG. 2, the arm 32 at the uppermost position is fitted with a down-head suspension assembly 30, while the arm 32 at the lowermost position is fitted with an up-head suspension assembly 30. Nine arms 32 located between these arms 32 at the uppermost and lowermost positions are each fitted with an up-head suspension assembly 30 and a down-head suspension assembly 30.

The suspension assembly 30 includes a base plate 38 of a substantially rectangular shape, a load beam 42 of an elongated leaf spring, and a flexure (wiring member) 40 of an elongated strip shape. The flexure 40 has a gimbal portion, which will be described later, and the magnetic head 17 is mounted on the gimbal portion. The base end of the base plate 38 is fixed to the extended end 32E of the arm 32 by, for example, swaging. The load beam 42 has its base end overlapped and fixed to an end of the base plate 38. The load beam 42 extends from the base plate 38 and is tapered toward an extension end of the load beam 42. The base plate 38 and the load beam 42, which function as a support plate, are formed of, for example, stainless steel.

The load beam 42 generates a spring force (reaction force) that urges the magnetic head 17 toward the surface of the magnetic disk 18. A tab 46 protrudes from the tip end of the load beam 42. The tab 46 can be engaged with the ramp 80 described above, and, together with the ramp 80, constitutes the ramp load mechanism 25.

The flexure 40 of each suspension assembly 30 has one end electrically connected to the magnetic head 17, the other end extending through a slit (groove) formed on a side edge of the arm 32 to reach the actuator block 29, and a connection end (tail connection terminal portion) 48c continued to the other end. The connection end 48c is formed into an elongated rectangular shape. The connection end 48c is provided with a plurality of connection terminals (connection pads) 51, for example, 13 connection terminals (connection pads) 51. These connection terminals 51 are connected respectively to wiring lines of the flexure 40. A plurality of wiring lines of the flexure 40 extend over substantially the entire length of the flexure 40, and one ends of the wiring lines are electrically connected to the magnetic head 17 as the other ends of the same are connected to the connection terminals (connection pads) 51.

The connection terminals 51 provided on the connection end 48c of the flexure 40 are joined to connection pads of a junction portion 21c, and are electrically connected to wiring lines of the junction portion 21c via the connection pads. Hence the 20 magnetic heads 17 of the actuator assembly 22 are each electrically connected to a base portion 21a through the wiring lines of the flexure 40, the connection end 48c, the junction portion 21c of the FPC unit 21, and a relay portion 21b.

As shown in FIG. 2, the FPC unit 21 includes the base portion 21a of a substantially rectangular shape that is bent into an L shape, the relay portion 21b of an elongated strip shape extending from one side edge of the base portion 21a, and the junction portion 21c continuous with the distal end of the junction portion 21c, the base portion 21a, the relay portion 21b, and the junction portion 21c being formed integrally. The base portion 21a, the relay portion 21b, and the junction portion 21c are formed of a flexible printed circuit board (FPC). The flexible printed circuit board includes an insulating layer made of polyimide and the like, a conductive layer formed on the insulating layer and having a plurality of wiring lines, connection pads, and the like, and a protective layer covering the conductive layer.

On the base portion 21a, electronic components, such as conversion connectors (not shown) and a plurality of capacitors, are mounted and are electrically connected to wiring lines (not shown). A metal plate that functions as a reinforcing plate is attached to the base portion 21a. The base portion 21a is disposed on the bottom wall 12a of the base 12. The relay portion 21b extends from a side edge of the base portion 21a toward the actuator block 29 of the actuator assembly 22. The junction portion 21c, which is provided on the extended end of the relay portion 21b, is formed into a rectangular shape having a height and a width that are substantially equal to the height and the width of a side surface (installation surface) of the actuator block 29. The junction portion 21c is attached to an installation surface of the actuator block 29 with a backing plate made of aluminum or the like interposed between the junction portion 21c and the installation surface, and is fixed to the installation surface, using fastening screws 72. The junction portion 21c is provided with a number of connection pads. For example, one head IC (head amplifier) 67 is mounted on the junction portion 21c and is connected to the connection pads and the base portion 21a via wiring lines. The junction portion 21c is provided also with a connection terminal 68 to which the voice coil 39 is connected.

With the actuator assembly 22 configured in the above manner being set on the base 12, the support shaft 31 is erected substantially parallel with the spindle of the spindle motor 19. Each magnetic disk 18 is located between two suspension assemblies 30. When the HDD is in operation, the magnetic heads 17 supported by two suspension assemblies 30 face the upper surface and the lower surface of the magnetic disk 18, respectively.

The actuator assembly 22 and the suspension assembly 30 will be described in detail.

Figure 4:
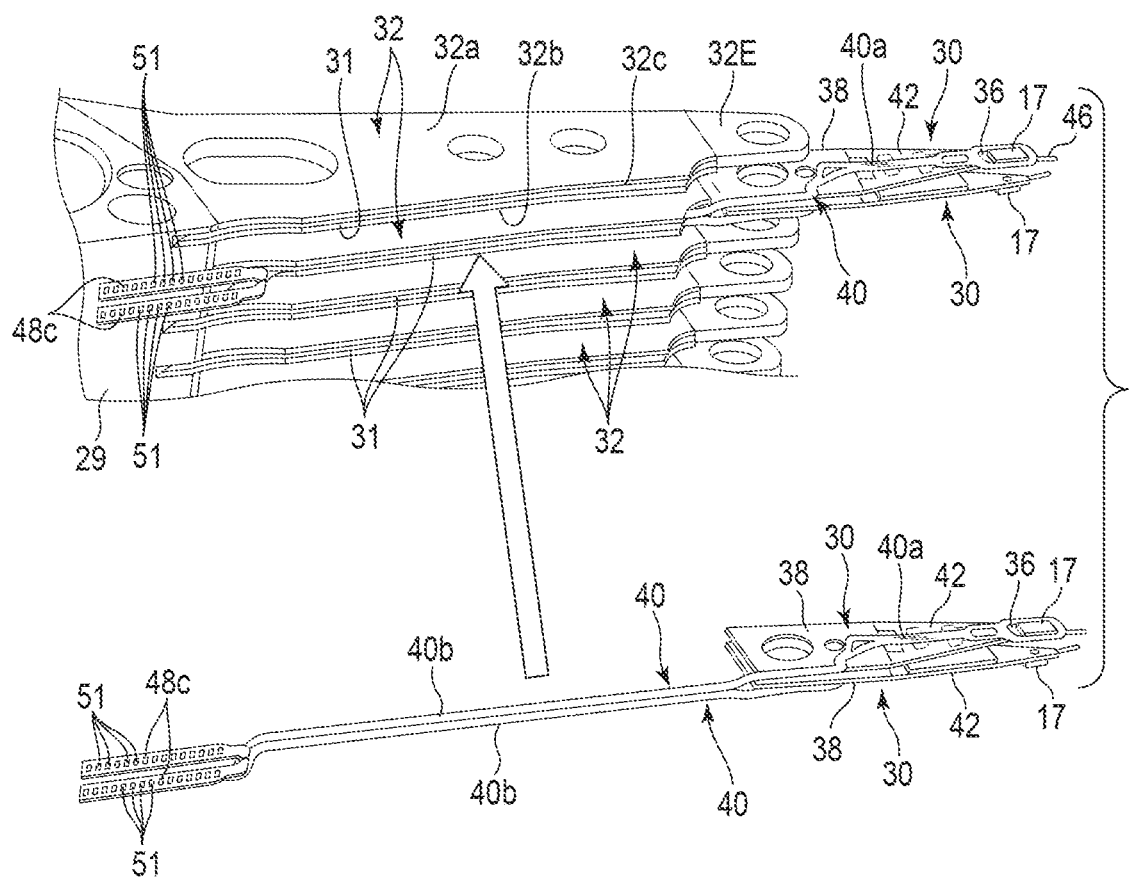
FIG. 4 is an exploded perspective view showing the arms and head suspension assemblies of the head actuator assembly.

FIG. 3 is a perspective view of the arms and the suspension assemblies 30, and FIG. 4 is an exploded perspective view showing the arms and an exploded view of one suspension assembly.

As shown in FIGS. 3 and 4, each arm 32 extending from the actuator block 29 is formed into, for example, an elongated plate shape. The arm 32 has an upper surface (first main surface) 32a, a lower surface (second main surface) 32b counter in parallel to the upper surface, a side surface 32c located closer to the magnetic disk 18 and intersecting the upper surface 32a and the lower surface 32b, and a slit (groove) 31 formed on the side surface 32c. The slit 31 extends from the actuator block 29 to the extended end of the arm 32 in such a way as to be substantially parallel with the first main surface 32a and with the second main surface 32b. A part of the flexure (wiring member) 40 is placed and held in the slit 31.

As described above, the uppermost arm 32 is fitted with the down-head suspension assembly 30, while the lowermost arm 32 is fitted with the up-head suspension assembly 30. The nine arms 32 located between the uppermost arm 32 and the lowermost arm 32 are each fitted with two suspension assemblies, i.e., the up-head suspension assembly 30 and the down-head suspension assembly 30, which are adjacent to each other with their backs facing each other.

The base end of the base plate 38 of each suspension assembly 30 is fixed to the distal end of each arm 32. The flexure 40 is formed of an elongated strip-shaped laminated plate, and has a distal end side portion 40a and a proximal end side portion 40b. The distal end side portion 40a is mounted to the load beam 42 and to the base plate 38. The distal end portion of the flexure 40 makes up a gimbal portion 36 that functions as an elastic support portion. The magnetic head 17 is mounted on the gimbal portion 36, and is supported by the load beam 42 via the gimbal portion 36.

The proximal end side portion 40b of the flexure 40 extends out of the side edge of the base plate 38, passes through the slit 31 formed on the side surface 32c of the arm 32, and reaches the proximal end of the arm 32 and the actuator block 29. At the end of the proximal end side portion 40b, the connection end (tail connection terminal portion) 48c of the flexure 40 is formed. The connection end 48c is bent substantially at right angles with the proximal end side portion 40b, and is, consequently, set substantially perpendicular to the arm 32. The connection end 48c includes a plurality of connection terminals 51, and is connected to the junction portion 21c of the FPC unit 21.

Figure 5:
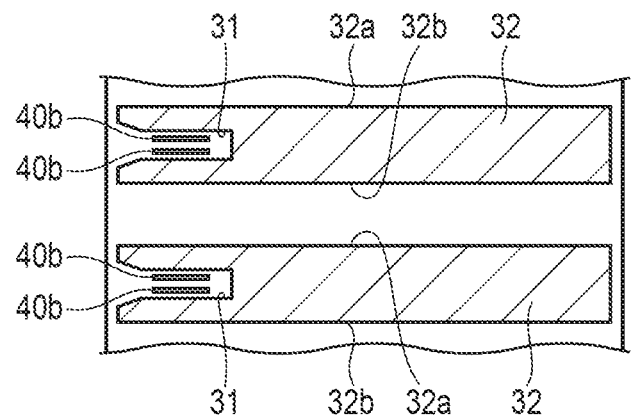
FIG. 5 is a cross-sectional view of arms and flexures taken along a line A-A of FIG. 3.
Figure 6:
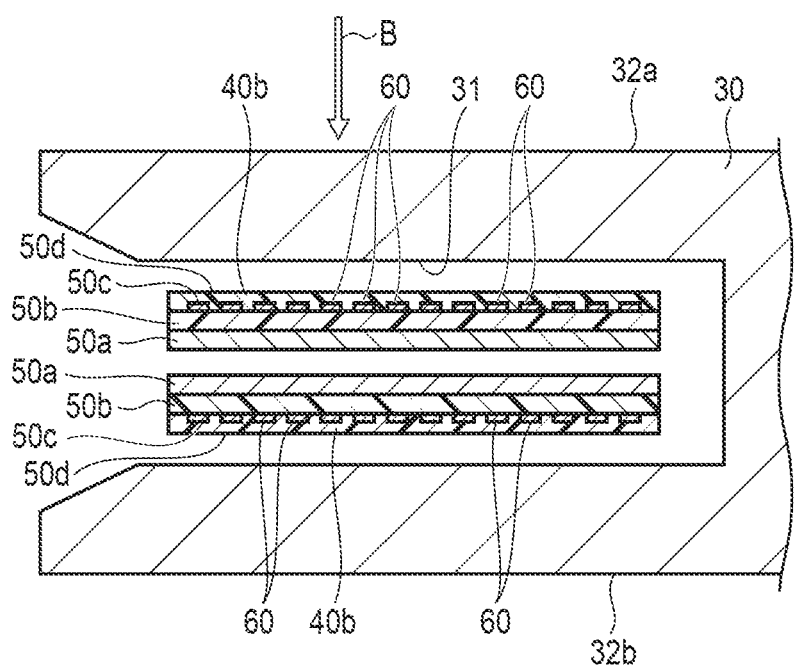
FIG. 6 is a cross-sectional view schematically showing an enlarged cross section of the flexures.

FIG. 5 is a cross-sectional view of the arms and the flexures taken along a line A-A of FIG. 3, and FIG. 6 is a sectional view schematically showing an enlarged cross section of the flexures.

As shown in FIG. 5, two flexures, that is, the proximal end side portion 40b of the flexure 40 of the up-head suspension assembly 30 and the proximal end side portion 40b of the flexure 40 of the down-head suspension assembly 30 are held in the slit 31 of the arm 32, to which two suspension assemblies 30 are fitted. In the slit 31, the proximal end side portions 40b are set substantially parallel and oppose to each other. When a direction perpendicular to the surface of the flexure 40 is defined as the vertical direction, two proximal end side portions 40b are opposed to each other in the vertical direction.

As shown in FIG. 6, each flexure 40 has a metal thin plate (metal plate) 50a made of stainless steel or the like and serving as a base, a base insulating layer 50b adhered or fixed to the upper surface of the metal thin plate 50a, a conductive layer (wiring pattern) 50c formed on the base insulating layer 50b and forming a plurality of wiring lines (signal lines, drive lines) 60, and a cover insulating layer 50d overlaid on the base insulating layer 50b to cover the conductive layer 50c. On the distal end side portion 40a of the flexure 40, the metal thin plate 50a side is pasted to the surfaces of the load beam 42 and the base plate 38 or spot-welded to the same at a plurality of welding points.

In the slit 31, the two proximal end side portions 40b are arranged such that their metal thin plates 50a are counter to each other. The flexure 40 of the up-head suspension assembly 30 will be referred to as flexure 40UP, and the flexure 40 of the down-head suspension assembly 30 will be referred to as flexure 40DN.

Figure 7B:
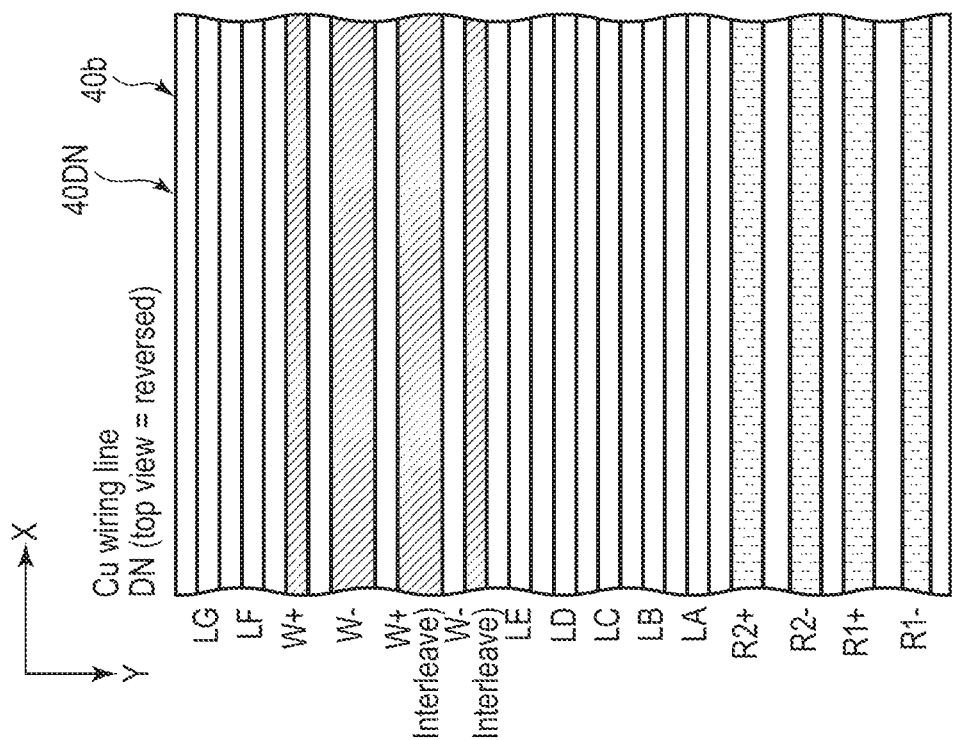
FIG. 7B is a plan views schematically showing a wiring pattern of a second flexure of the same.
Figure 7A:
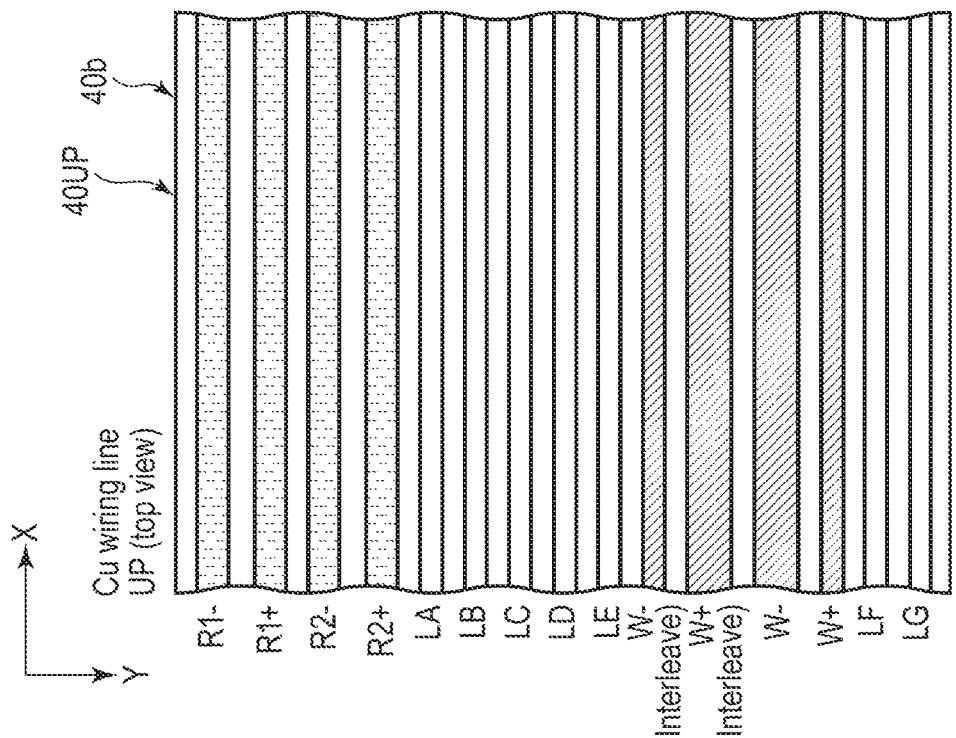
FIG. 7A is a plan view schematically showing a wiring pattern of a first flexure of the head suspension assembly.
Figure 8:
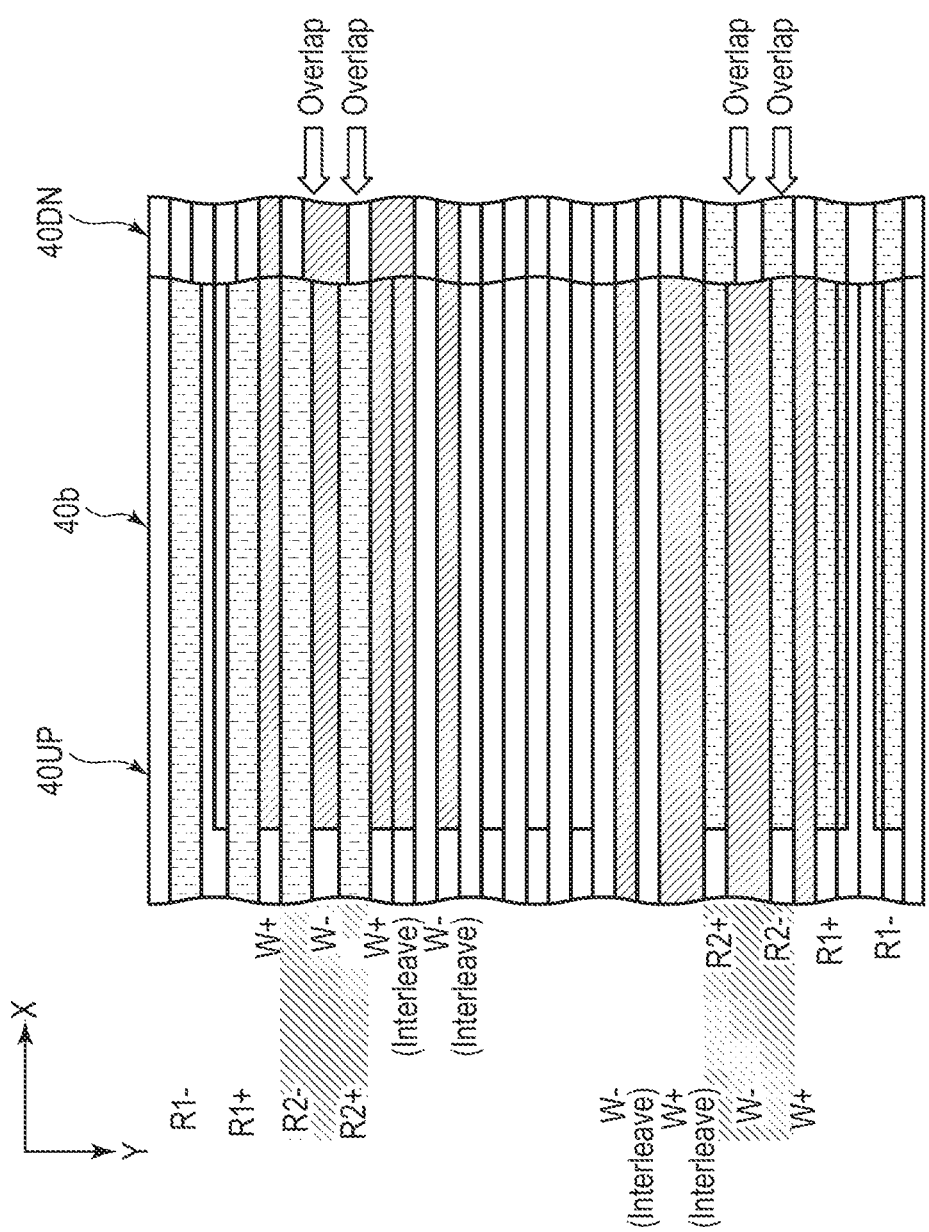
FIG. 8 is a plan view schematically showing a state in which the first flexure and the second flexure are vertically overlapped.

FIGS. 7A and 7B are plan views schematically showing a wiring pattern of the flexure 40UP and a wiring pattern of the flexure 40DN, respectively, and FIG. 8 is a plan view schematically showing a state in which the flexures 40UP and 40DN are overlapped. FIGS. 7A, 7B and 8 show wiring patterns that are observed when the flexures 40 are seen in a direction B indicated in FIG. 6 (from above).

In the HDD of this embodiment, each magnetic head 17 is, for example, a two-dimensional magnetic recording (TDMR) type magnetic head. In addition, the HDD is a dual drive type HDD capable of separately driving an UP head and a DN head independent of each other.

As shown in FIG. 7A, when the longitudinal direction of the flexure 40 is denoted as X and the width direction of the same is denoted as Y, the flexure 40UP has a large number of wiring lines, for example, 15 wiring lines extending in the longitudinal direction X. The 15 wiring lines are lined up at intervals in the width direction Y. The wiring lines each have one end connected to a write element, a read element, an assist element, an HDI sensor, or the like of the magnetic head 17 or to a piezoelectric element (not shown), and the other end connected to a connection terminal 51 of the connection end 48c.

These wiring lines include a read line (R1−), a read line (R1+), a read line (R2−), and a read line (R2+) to which read signals are sent from two readers (read heads) of the magnetic head 17. These read lines are lined up in the width direction Y in decreasing order in which, for example, the read lines are arranged from one end in the width direction Y of the flexure 40UP, i.e., an upper end toward a lower end. Following these lines, five wiring lines LA, LB, LC, LD, and LE are arranged in decreasing order in the width direction Y.

Following these lines, a write (inverleaved) line (W−), a write (inverleaved) line (W+), a write line (W−), and a write line (W+), which supply recording signals to a writer (recording head) of the magnetic head 17, are arranged in decreasing order in the width direction Y. In this embodiment, the width (second width) of the write (inverleaved) line (W+) and that of the write line (W−) in the width direction Y are made approximately two times the width (first width) of the write (inverleaved) line (W−) and that of the write line (W+), respectively.

Two wiring lines LF and LG are further lined up in the width direction Y.

In one example in which the width of the flexure 40 in the width direction Y is 1 mm, the first width of the write line is about 40 μm and the second width of the same is about 80 μm.

The inverleaved line represents one of two wiring lines that branch in front of the proximal end side portion 40b from a wiring line (mainly a write line or read line) extended from the head element to continue extending. The two wiring lines branching out of a single wiring line each have a smaller width, thus having lower impedance.

As shown in FIG. 7B, the flexure 40DN has a large number of wiring lines, for example, 15 wiring lines extending in the longitudinal direction X. The 15 wiring lines are lined up at intervals in the width direction Y. The 15 wiring lines each have one end connected to the write element, the read element, the assist element, the HDI sensor, or the like of the magnetic head 17 or to the piezoelectric element, and the other end connected to the connection terminal 51 of the connection end 48c. The 15 wiring lines are lined up in the width direction Y in the order reverse to the order of arrangement of the wiring lines of the flexure 40UP on the up-head side.

Specifically, the read line (R1−), the read line (R1+), the read line (R2−), and the read line (R2+) are lined up in the width direction Y in increasing order in which, for example, they are lined up from the other end in the width direction Y, i.e., the lower end toward the upper end. Following these lines, five wiring lines LA, LB, LC, LD, and LE are arranged in decreasing order in the width direction Y.

Following these lines, the write (inverleaved) line (W−), the write (inverleaved) line (W+), the write line (W−), and the write line (W+), which supply recording signals to the writer (recording head) of the magnetic head 17, are arranged in increasing order in the width direction Y. In this embodiment, the width (second width) of the write (inverleaved) line (W+) and that of the write line (W−) in the width direction Y are made approximately two times the width (first width) of the write (inverleaved) line (W−) and that of the write line (W+), respectively.

Two wiring lines LF and LG are further lined up in the width direction Y.

In one example in which the width of the flexure 40 in the width direction Y is 1 mm, the first width of the write line is about 40 μm and the second width of the same is about 80 μm.

As shown in FIG. 8, in the slit 31, the flexure 40UP and the flexure 40DN are vertically overlapped. Setting the wiring pattern of the flexure 40UP and that of the flexure 40DN reverse to each other in the above manner achieves a wiring arrangement in which the write lines and the read lines are not counter to each other.

Specifically, the read line (R1−), the read line (R1+), the read line (R2−), and the read line (R2+) of the flexure 40UP are not vertically counter to the read line (R1−), the read line (R1+), the read line (R2−), and the read line (R2+) of the flexure 40DN but are widely separated from them in the width direction Y.

In addition, at least two read lines, i.e., the read line (R1−) and the read line (R1+) of the flexure 40UP are not vertically counter to the write line (W+) and the write line (W−) of the flexure 40DN but are located offset to them in the width direction Y. The read line (R2−) and read line (R2+) of the flexure 40UP are arranged such that their respective end parts in the width direction Y (for example, an area equivalent to 50% or less of the width of the read line) are vertically counter to (overlap) the write line (W−) of the flexure 40DN. In other words, the read line (R2−) and the read line (R2+) of the flexure 40UP are shifted in the width direction Y relative to the write line (W−) of the flexure 40DN by at least 50% of the wring line width.

In this manner, the read lines and write lines of the flexures 40UP and 40DN counter to each other in the slit 31 are arranged such that the read lines and the write lines do not overlap each other. This arrangement reduces crosstalk between these read lines and write lines.

In the case of this embodiment where a pair of the read lines (R2−) and (R2+) connected to one of two read heads are arranged in such a way as to partially overlap the write line (W−), when an up-head and a down-head are driven separately, operations of these heads are controlled so that they do not affect the wiring lines overlapping each other. Specifically, while the down-head is performing a write operation via the write lines (W+) and (W−), the control unit (printed circuit board 27) of the head actuator controls the up-head such that a read head connected to the read lines (R1−) and (R1+) not overlapping the write line (W−) performs a read operation. In other words, while the down-head is performing the write operation via the write lines (W+) and (W−), the control unit prohibits an up-side read head (up-head) connected to the read lines (R2−) and (R2+) overlapping the write line (W−) from performing the read operation, and only permits the read head connected to the read lines (R1−) and (R1+) not overlapping the write line (W−) to perform the read operation.

Likewise, while the up-head is performing the write operation via the write lines (W+) and (W−), the control unit controls the down-head so that a read head connected to the read lines (R1−) and (R1+) not overlapping the write line (W−) performs the read operation. In other words, while the up-head is performing the write operation via the write lines (W+) and (W−), the control unit prohibits a down-side read head (down-head) connected to the read lines (R2−) and (R2+) overlapping the write line (W−) from performing the read operation, and only permits the read head connected to the read lines (R1−) and (R1+) not overlapping the write line (W−) to perform the read operation.

According to the HDD configured in the above manner, despite the fact that the flexure 40UP on the up-head side and the flexure 40DN on the down-head side are set vertically adjacent and counter to each other in the slit of the arm, crosstalk between wiring lines can be reduced by arranging the wiring lines of the flexures 40UP and 40DN such that the read lines and the write lines do not overlap each other. In addition, when write lines and read lines partially overlap each other, control for preventing simultaneous driving of the overlapping wiring lines is performed to eliminate crosstalk effects.

Hence, according to this embodiment, a suspension assembly and an HDD that can reduce crosstalk between wiring lines to improve reliability are provided.

An HDD according to another embodiment of the present invention will be described. In another embodiment, the same parts as described in the first embodiment are denoted by the same reference numerals as in the first embodiment, and detailed description of such parts may be simplified or omitted.

Second Embodiment

Figure 9B:
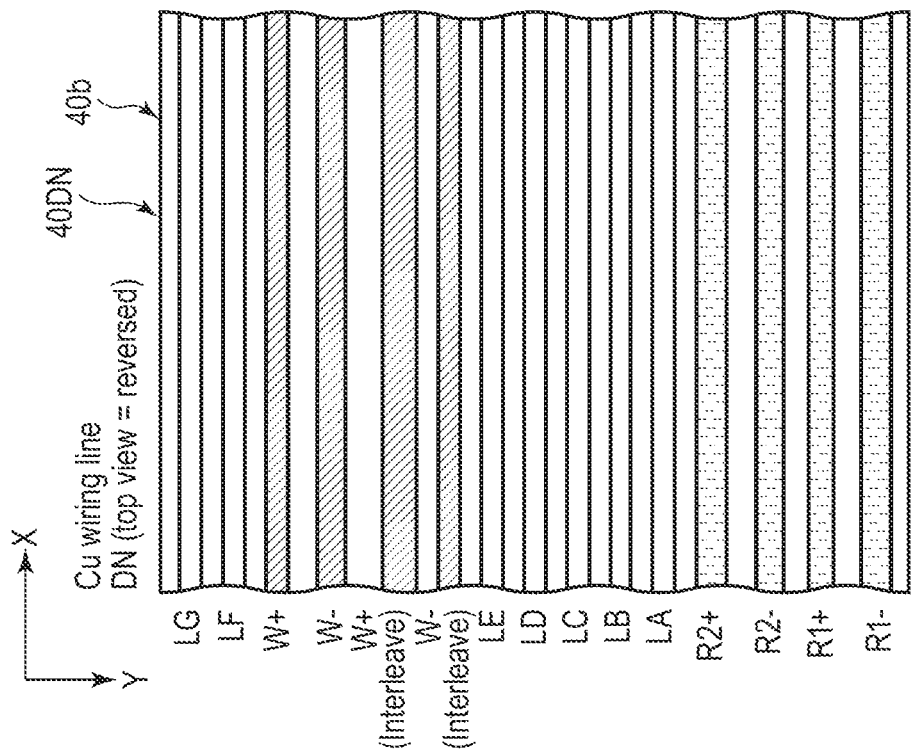
FIG. 9B is a plan view schematically showing a wiring pattern of a second flexure of the head suspension assembly in the second embodiment.
Figure 9A:
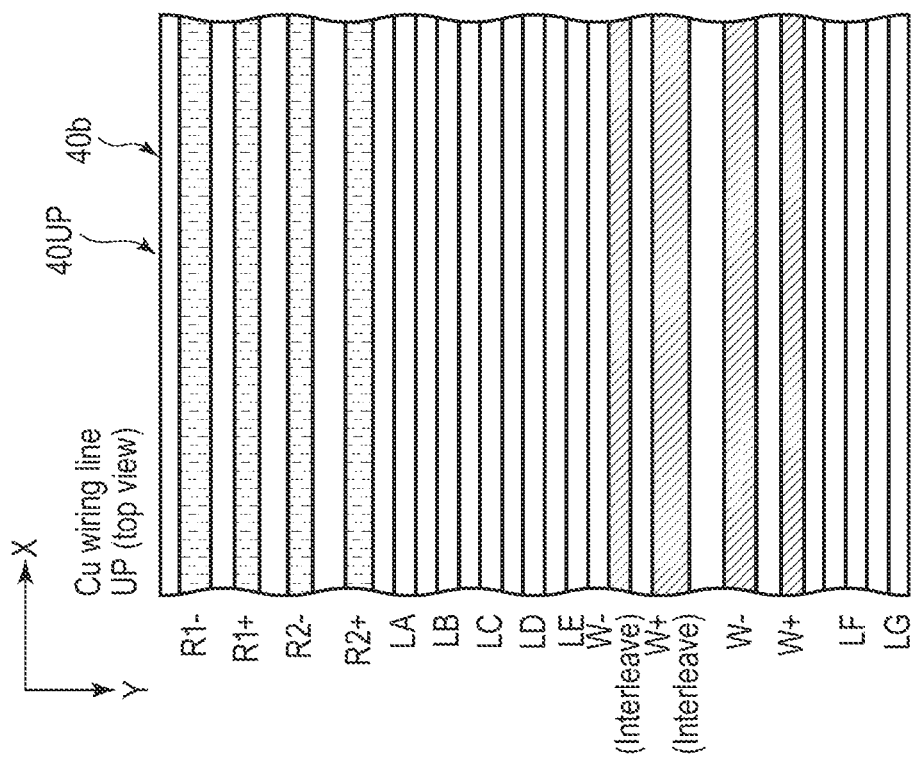
FIG. 9A is a plan view schematically showing a wiring pattern of a first flexure of a head suspension assembly of an HDD according to a second embodiment.
Figure 10:
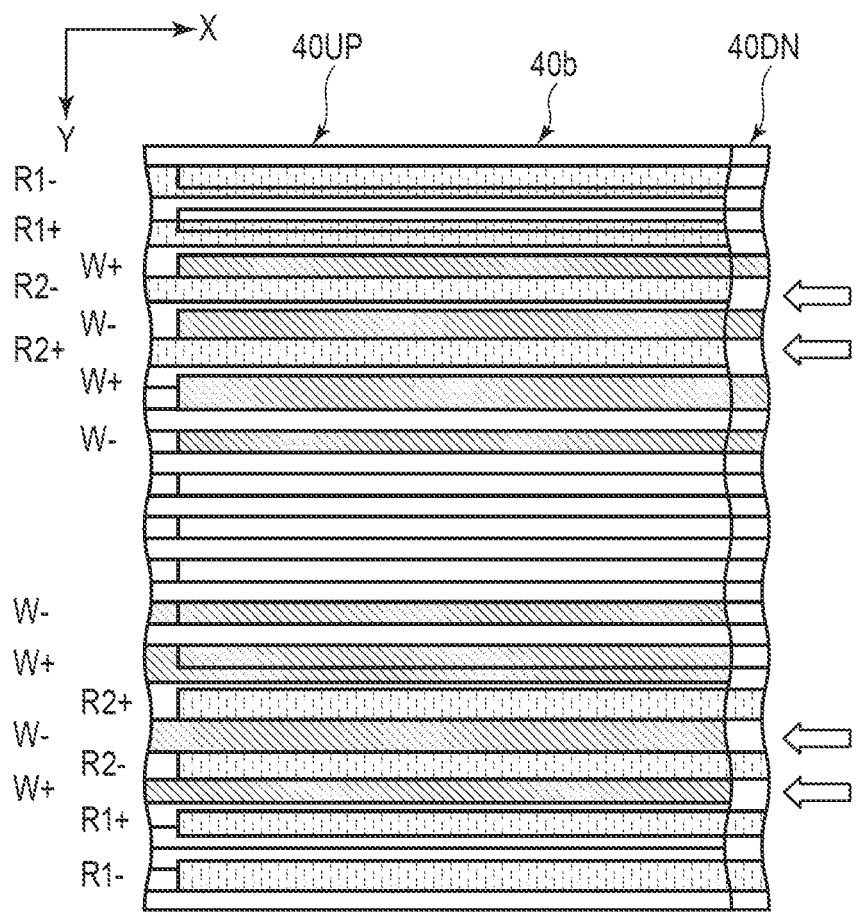
FIG. 10 is a plan view schematically showing a state in which the first flexure and the second flexure according to the second embodiment are vertically overlapped.

FIGS. 9A and 9B are plan views schematically showing respective wiring patterns of a flexure 40UP and a flexure 40DN according to a second embodiment, and FIG. 10 is a plan view schematically showing a state in which the flexures 40UP and 40DN are vertically overlapped. FIGS. 9A and 9B and FIG. 10 show wiring patterns that are observed when the flexures 40 are seen in the direction B indicated in FIG. 6 (from above).

As shown in FIG. 9A, the flexure 40UP of the second embodiment has the same wiring lines as those of the flexure 40UP of the first embodiment, and these wiring lines are arranged in the same manner as in the first embodiment where the longitudinal direction of the flexure 40 is denoted as X and the width direction of the same is denoted as Y. Specifically, the flexure 40UP includes a read line (R1−), a read line (R1+), a read line (R2−), and a read line (R2+); five wiring lines LA, LB, LC, LD, and LE; a write (inverleaved) line (W−), a write (inverleaved) line (W+), a write line (W−), and a write line (W+); and two wiring lines LF and LG, which are lined up in the width direction Y in decreasing order in which, for example, the wiring lines are arranged from the one end in the width direction Y, i.e., the upper end toward and the lower end.

According to the first embodiment, the width of the write (inverleaved) line (W+) and that of the write line (W−) in the width direction Y are made approximately two times the width of the write (inverleaved) line (W−) and that of the write line (W+), respectively. According to the second embodiment, however, only the width of the light (inverleaved) line (W+) is made approximately two times the width of the write (inverleaved) line (W−), and the width of the write line (W−) is made approximately 1.5 times the width of the write line (W+). This means that the write line (W−) is formed to have a width smaller than that of the write (inverleaved) line (W+).

In one example in which the width of the write line (W+) in the width direction Y is 40 μm, the width of the write line (W−) in the width direction Y is about 60 μm.

As shown in FIG. 9B, the flexure 40DN has the same wiring lines as those of the flexure 40UP of the first embodiment, and these wiring lines are arranged in the same manner as in the first embodiment. The wiring lines of the flexure 40DN are lined up in the width direction Y in the order reverse to the order of arrangement of the wiring lines of the flexure 40UP on the up-head side.

Specifically, the flexure 40DN has the read line (R1−), the read line (R1+), the read line (R2−), and the read line (R2+); the five wiring lines LA, LB, LC, LD, and LE; the write (inverleaved) line (W−), the write (inverleaved) line (W+), the write line (W−), and the write line (W+); and the two wiring lines LF and LG, which are lined up in the width direction Y in increasing order in which, for example, the wiring lines are arranged from the other end in the width direction Y, i.e., the lower end toward the upper end.

In the second embodiment, only the width of the light (inverleaved) line (W+) is made approximately two times the width of the write (inverleaved) line (W−), and the width of the write line (W−) is made approximately 1.5 times the width of the write line (W+). This means that the write line (W−) is formed to have a width smaller than that of the write (inverleaved) line (W+).

As shown in FIG. 10, the flexure 40UP and the flexure 40DN are vertically overlapped in the slit 31 of the arm 32. Setting the wiring pattern of the flexure 40UP and that of the flexure 40DN reverse to each other in the above manner achieves a wiring arrangement in which the write lines and the read lines are not vertically opposed to each other.

Specifically, the read line (R1−), the read line (R1+), the read line (R2−), and the read line (R2+) of the flexure 40UP are not opposed to the read line (R1−), the read line (R1+), the read line (R2−), and the read line (R2+) of the flexure 40DN but are widely separated from them in the width direction Y.

In addition, the read line (R1−) and the read line (R1+) of the flexure 40UP are not opposed to the write line (W+) and the write line (W−) of the flexure 40DN but are located offset to them in the width direction Y.

According to the second embodiment, as a result of making the write line (W−) smaller in width than the write (inverleaved) line (W+), the write line (W−) is not vertically opposed to the read line (R2−) and the read line (R2+), that is, does not vertically overlap them but is shifted relative to them in the width direction Y. In this manner, by arranging all read lines and write lines of the flexures 40UP and 40DN such that they do not overlap each other, crosstalk between these wiring lines can be reduced.

In the second embodiment, other constituent elements of the suspension assembly and the HDD are the same as those of the above-described suspension assembly and the HDD of the first embodiment.

According to the second embodiment configured in the above manner, despite the fact that the flexure 40UP on the up-head side and the flexure 40DN on the down-head side are set vertically adjacent and opposed to each other in the slit of the arm, the wiring arrangement of the flexures 40UP and 40DN can be made such that the read lines and the write lines do not overlap each other. Hence a suspension assembly and an HDD that can reduce crosstalk between wiring lines to improve reliability are provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

For example, in the above-described embodiments, the number of wiring lines of the flexure is not limited to 15, and may be increased or decreased on a necessary basis. The arrangement of wiring lines of the flexure 40UP and that of the flexure 40DN may be set in reverse arrangements, respectively. The number of magnetic disks mounted is not limited to 10, and may be increased to 11 or 12.

What is claimed is:

1. A head actuator comprising:
   a first suspension assembly including a first support plate, a first wiring member on the first support plate, including a plurality of first wiring lines, and a first head supported by the first support plate and facing in a first direction; and
   a second suspension assembly including a second support plate opposed to the first support plate with a gap, a second wiring member on the second support plate, including a plurality of second wiring lines, and a second head supported by the second support plate and facing in a second direction opposite to the first direction, wherein
   the first wiring member includes a first proximal end side portion extending out of the first support plate,
   the second wiring member includes a second proximal end side portion extending out of the second support plate and opposed to the first proximal end side portion,
   the first wiring lines include at least four first read lines and at least four first write lines, the first read lines and first write lines extending in a longitudinal direction of the first wiring member and lined up at intervals in a width direction of the first wiring member,
   the second wiring lines include at least four second read lines and at least four second write lines, the second read lines and second write lines extending in a longitudinal direction of the second wiring member and lined up at intervals in a width direction of the second wiring member, and
   at least two of the first read lines and at least two of the first write lines are arranged at a position offset to the second read lines and the second write lines in the width direction so that the first read lines and the first write lines are not opposite to the second read lines and the second write lines in a direction perpendicular to a surface of the first wiring member.

2. The head actuator of claim 1, wherein
   the first wiring lines include 15 or more first wiring lines, and the second wiring lines include 15 or more second wiring lines, and
   at least two of the first read lines and at least two of the first write lines are arranged at a position shifted relative to the second read lines and the second write lines in the width direction by 50% or more of a wiring line width.

3. The head actuator of claim 1, wherein
   the four first read lines and the four first write lines are arranged at a position shifted relative to the second read lines and the second write lines in the width direction so that the four first read lines and the four first write lines are not opposite to the second read lines and the second write lines in the direction perpendicular to the surface of the first wiring member.

4. The head actuator of claim 3, wherein
   the first wiring lines include 15 or more first wiring lines, and the second wiring lines include 15 or more second wiring lines, and wherein
   the four first read lines and the four first write lines are arranged at a position shifted relative to the second read lines and the second write lines in the width direction so that the four first read lines and the four first write lines are not opposite to the second read lines and the second write lines in the direction perpendicular to the surface of the first wiring member.

5. The head actuator of claim 1, further comprising:
   an actuator block; and
   a plurality of arms extending from the actuator block, the arms each including a slit extending from an extended end of the arm to the actuator block, wherein
   the first support plate of the first suspension assembly is fixed to the extended end of the arm, and the first proximal end side portion is arranged in the slit of the arm, and
   the second support plate of the second suspension assembly is fixed to the extended end of the arm, and the second proximal end side portion is arranged in the slit of the arm and opposed to the first proximal end side portion.

6. The head actuator of claim 5, wherein
   the first wiring member includes a metal plate, a base insulating layer on the metal plate, a conductive layer on the base insulating layer, forming the first wiring lines, and a cover insulating layer overlaid on the base insulating layer to cover the conductive layer,
   the second wiring member includes a metal plate, a base insulating layer on the metal plate, a conductive layer on the base insulating layer, forming the second wiring lines, and a cover insulating layer overlaid on the base insulating layer to cover the conductive layer, and
   the first proximal end side portion and the second proximal end side portion are arranged in the slit such that the metal plates face each other.

7. The head actuator of claim 1, wherein
   the four first write lines include two first write lines with a first width and two first write lines with a second width larger than the first width,
   the four second write lines include two second write lines with a first width and two second write lines with a second width larger than the first width,
   one of the first write lines with the second width has an end in the width direction opposed to one of the second read lines in the direction perpendicular to the surface of the first wiring member, and one of the second write lines with the second width has an end in the width direction opposed to one of the first read lines in the direction perpendicular to the surface of the second wiring member.

8. The head actuator of claim 7, further comprising a controller which, while the first head is performing a write operation via the first write lines, prohibits the second head from performing a read operation via the second read lines partially opposing the first write lines in the perpendicular direction, and which, while the second head is performing a write operation via the second write lines, prohibits the first head from performing a read operation via the first read lines partially opposing to the second write lines in the perpendicular direction.

9. A disk device comprising:
a disk-shaped recording medium capable of rotating; and
the head actuator according to claim 1.

* * * * *